(12) United States Patent
Danielson et al.

(10) Patent No.: US 9,778,914 B2
(45) Date of Patent: Oct. 3, 2017

(54) AUTOMATIC DISCOVERY OF COMPARABLE FEATURES BASED ON N-GRAM ANALYSIS

(71) Applicant: CA, Inc., New York, NY (US)

(72) Inventors: Debra Danielson, Skillman, NJ (US); Navid Rezvani, Los Altos, CA (US)

(73) Assignee: CA, Inc., New York, NY (US)

( * ) Notice: Subject to any disclaimer, the term of this patent is extended or adjusted under 35 U.S.C. 154(b) by 48 days.

(21) Appl. No.: 14/750,098

(22) Filed: Jun. 25, 2015

(65) Prior Publication Data

US 2016/0378435 A1 Dec. 29, 2016

(51) Int. Cl.
*G06F 9/44* (2006.01)
*G06F 9/45* (2006.01)
*G06F 9/445* (2006.01)
*G06F 17/27* (2006.01)
*G06F 11/36* (2006.01)

(52) U.S. Cl.
CPC ............ *G06F 8/10* (2013.01); *G06F 8/20* (2013.01); *G06F 8/65* (2013.01); *G06F 8/70* (2013.01); *G06F 17/275* (2013.01); *G06F 11/3636* (2013.01); *G06F 11/3688* (2013.01)

(58) Field of Classification Search
CPC .. G06F 17/30554; G06F 8/71; G06F 11/3688; G06F 11/3636; G06F 11/3676; G06F 11/3003; G06F 11/0748; G06F 8/70; G06F 8/73; G06F 8/75; G06F 17/30;
(Continued)

(56) References Cited

U.S. PATENT DOCUMENTS 6,282,698 B1 * 8/2001 Baker ..................... G06F 8/75
717/118
8,037,535 B2 * 10/2011 Maloof ................. G06F 21/562
713/188

(Continued)

OTHER PUBLICATIONS

Salha M. Alzahrani et al., Understanding Plagiarism Linguistic Patterns, Textual Features, and Detection Methods, IEEE vol. 42, No. 2 Mar. 2012, [Retrieved on May 22, 2017]. Retrieved from the internet: <URL: http://ieeexplore.ieee.org/stamp/stamp.jsp?arnumber=5766764> 17 Pages (133-149).*

(Continued)

*Primary Examiner* — Thuy Dao
*Assistant Examiner* — Anibal Rivera
(74) *Attorney, Agent, or Firm* — Coats & Bennett, PLLC (57) ABSTRACT

According to one aspect of the present disclosure, a computer-implemented method is disclosed in which a software development log whose entries describe potential features for a future release of a first software program is accessed to obtain a text description of a feature from an entry. The text description is decomposed using a predefined n-gram decomposition technique to produce a first set of n-grams. The method includes determining whether a second software program includes the feature. The determining includes comparing the first set of n-grams to a second set of n-grams which describe the second software program, and calculating a similarity metric based on the comparing that indicates an extent to which matches for the n-grams in the first set are present in the second set. The software development log is updated based on the determining.

21 Claims, 6 Drawing Sheets

(58) Field of Classification Search
CPC .......... G06F 17/30011; G06F 17/273; G06F 17/275; G06F 21/562; G06F 9/54; G06N 99/005
See application file for complete search history.

(56) References Cited

U.S. PATENT DOCUMENTS

| | | | |
|---|---|---|---|
| 2004/0162827 A1* | 8/2004 | Nakano | G06F 17/30675 |
| 2006/0005166 A1* | 1/2006 | Atkin | G06F 8/71 717/120 |
| 2006/0184357 A1* | 8/2006 | Ramsey | G06F 17/275 704/9 |
| 2008/0270991 A1* | 10/2008 | Zeidman | G06F 8/71 717/126 |
| 2009/0089754 A1* | 4/2009 | Zeidman | G06F 8/73 717/123 |
| 2009/0313271 A1* | 12/2009 | Zeidman | G06F 8/71 |
| 2010/0229157 A1* | 9/2010 | Ergan | G06F 11/0748 717/128 |
| 2011/0219012 A1* | 9/2011 | Yih | G06F 17/30 707/749 |
| 2012/0029910 A1* | 2/2012 | Medlock | G06F 3/0237 704/9 |
| 2012/0131015 A1* | 5/2012 | Al Badrashiny | G06F 17/273 707/748 |
| 2013/0086553 A1* | 4/2013 | Grechanik | G06F 8/70 717/123 |
| 2013/0326476 A1* | 12/2013 | Wyatt | G06F 8/70 717/120 |
| 2015/0121397 A1* | 4/2015 | Park | G06F 9/54 719/313 |
| 2015/0186787 A1* | 7/2015 | Kumar | G06F 17/30011 706/12 |
| 2015/0254151 A1* | 9/2015 | Baril | G06F 11/3003 702/182 |
| 2015/0254161 A1* | 9/2015 | Baril | G06F 11/3616 717/124 |
| 2015/0254162 A1* | 9/2015 | Baril | G06F 11/3636 717/128 |
| 2015/0254163 A1* | 9/2015 | Baril | G06F 11/3636 714/38.1 |
| 2015/0254165 A1* | 9/2015 | Baril | G06F 11/3676 714/38.1 |
| 2015/0254172 A1* | 9/2015 | Baril | G06F 11/3688 717/128 |
| 2016/0154861 A1* | 6/2016 | Hegerty | G06F 17/30554 707/728 |

OTHER PUBLICATIONS

Efstathios Stamatatos, Intrinsic Plagiarism Detection Using Character n-gram Profiles, 2009, [Retrieved on May 22, 2017]. Retrieved from the internet: <URL: http://ceur-ws.org/Vol-502/paper8.pdf> 9 Pages (33-46).*

Ted Pedersen. "Ngram Statictics package Bibliography." Aug. 10, 2009; pp. 1-7; [Retrieved on Jun. 25, 2015]; Retrieved from Internet: http://www.d.umn.edu/~tpederse/nsp-bib/.

Zhang. "N-Gram Extraction Tools." Jun. 5, 2009; pp. 1-3; [Retrieved on Jun. 25, 2015]; Retrieved from Internet: http://homepages.inf.ed.ac.uk/lzhang10/ngram.html.

* cited by examiner

AUTOMATIC DISCOVERY OF COMPARABLE FEATURES BASED ON N-GRAM ANALYSIS

TECHNICAL FIELD

The present disclosure relates to analyzing features for a future release of a software program, and more particularly to using n-gram analysis to determine whether software programs include a given feature.

BACKGROUND

When developing a future release of a software application, software developers typically seek to implement a specific list of required features based on input from a product manager. The required features often includes a combination of new features not already present in the product, and bug fixes for resolving existing defects in the software application.

Product managers are typically tasked with determining which specific features, out of a large software development log, should be required features for a given release. The log (sometimes termed a "backlog", particularly in the context of agile software development) may contain many thousands of entries. Prioritizing them and determining which features to include on the list for a given release is an arduous, time-consuming task for product managers, as additional entries may be added to the log frequently, and the competitive landscape of what features are included in other software programs can be challenging to monitor and analyze.

SUMMARY

According to one aspect of the present disclosure, a computer-implemented method is disclosed in which a software development log whose entries describe potential features for a future release of a first software program is accessed to obtain a text description of a feature from an entry. The text description is decomposed using a predefined n-gram decomposition technique to produce a first set of n-grams. The method includes determining whether a second software program includes the feature. The determining includes comparing the first set of n-grams to a second set of n-grams which describe the second software program, and calculating a similarity metric based on the comparing that indicates an extent to which matches for the n-grams in the first set are present in the second set. The software development log is updated based on the determining.

According to another aspect of the present disclosure, a computing device is disclosed that includes an interface circuit to communicate with a software development log whose entries describe potential features for a future release of a first software program. The computing device also includes a processing circuit that is operatively connected to the interface circuit. The processing circuit is configured to access the software development log to obtain a text description of a feature from an entry, decompose the text description using a predefined n-gram decomposition technique to produce a first set of n-grams, and determine whether a second software program includes the feature. To determine whether the second software program includes the feature, the processing circuit is configured to compare the first set of n-grams to a second set of n-grams which describe the second software program; and calculate a similarity metric based on the comparing that indicates an extent to which matches for the n-grams in the first set are present in the second set. The processing circuit is configured to update the software development log based on the determining.

According to another aspect of the present disclosure, a computer program product is disclosed which includes a computer readable storage medium having computer readable program code embodied therewith. The computer readable program code includes computer readable program code configured to access a software development log whose entries describe potential features for a future release of a first software program, to obtain a text description of a feature from an entry. The computer readable program code also includes computer readable program code configured to decompose the text description using a predefined n-gram decomposition technique to produce a first set of n-grams. The computer readable program code also includes computer readable program code configured to determine whether a second software program includes the feature, comprising: computer readable program code configured to compare the first set of n-grams to a second set of n-grams which describe the second software program; and computer readable program code configured to calculate a similarity metric based on the comparing that indicates an extent to which matches for the n-grams in the first set are present in the second set. The computer readable program code also includes computer readable program code configured to update the software development log based on the determining.

Of course, the present disclosure is not limited to the above features and advantages. Indeed, those skilled in the art will recognize additional features and advantages upon reading the following detailed description, and upon viewing the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a non-transitory computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The present disclosure describes a method, apparatus, and computer program product for using n-gram analysis to determine whether software programs include a given feature. This can be used to facilitate a determination of what features should be included in a future release of a software program. For example, a determination can be made of whether a given feature is present in a software program of a competitor. If present, that may indicate a competitive shortcoming because the feature is missing in one's own software application. If absent, that may indicate a potential competitive advantage, because adding the feature to one's own software program could provide a competitive advantage over a competitor.

N-grams are small clusters of words that are significant together, and that take context into account. For example, the words "white house" could mean a house that is white, or could mean the "White House" in which the president of the United States resides. Based on the context in which "white house" appears, an appropriate n-gram can be created. Natural language processing is used to determine n-grams. Use of n-grams can be useful in determining whether given features being considered for inclusion in a future release in a software program are already present in other software programs (e.g., competitor programs, an organization's own non-competitor programs, and/or open source software programs).

According to one aspect of the present disclosure, a determination is made of whether a given feature is included in a first software program, with the determining including comparing a first set of n-grams that describe the given feature in a software program under development ("source n-grams") to a second set of n-grams that describe a different second software program ("target n-grams"). The target n-grams may describe a competitor software application, an open source software (OSS) application, and/or another software program already available from an organization that maintains the log 12, for example. Thus, an organization could use the techniques described herein to determine if any of its own software programs already include the feature, as this could indicate a potential opportunity for code reuse. Similarly, a feature being present in an OSS application could also indicate a potential opportunity for code reuse.

The determination of whether a given feature is included in a software program includes calculation of a similarity metric that indicates an extent to which matches for the n-grams in the first set are present in the second set. A classification may then be determined for the feature, based on how many additional software programs include the given feature (e.g., how many competitors include the feature, how many OSS programs include the feature, etc.).

Although OSS programs and competitor programs are discussed separately below, it is understood that OSS n-grams and competitor n-grams may not be mutually exclusive, as an OSS software program may be considered to be a competing software program in some instances.

Figure 1:
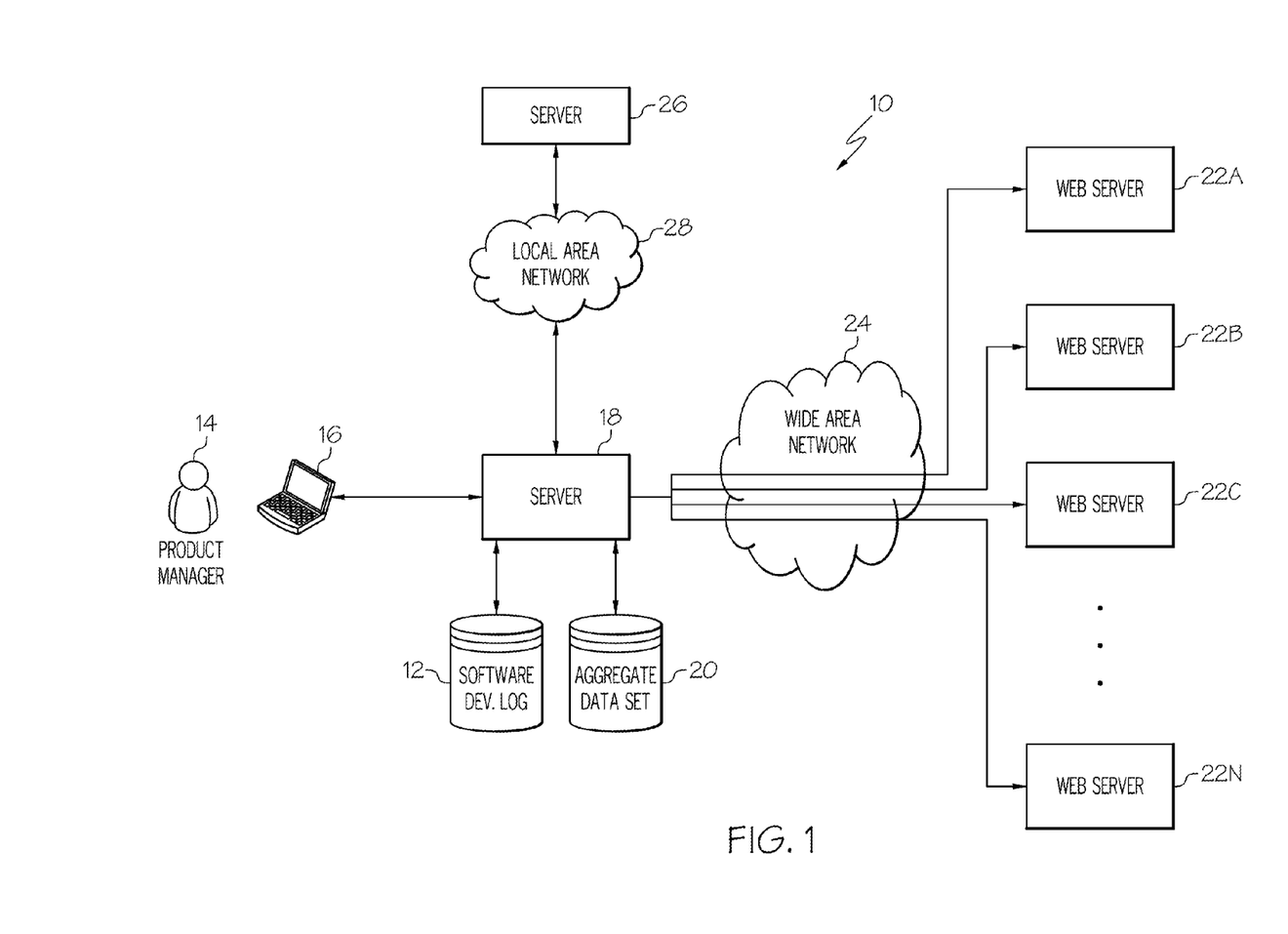
FIG. 1 schematically illustrates an example configuration for using n-gram analysis to determine whether software programs include a given feature.

FIG. 1 schematically illustrates an example configuration for 10 using n-gram analysis to determine whether software programs include a given feature. The entries of a software development log 12 describe potential features for a future release of a first software program (hereinafter the "program under development"), and may include any combination of new features not already present in the program, and bug fixes for resolving existing defects in the software program. There may be many thousands of entries in the log 12 in some embodiments.

A product manager 14, or other user, uses computing device 16 to access the log 12 via a server 18, to view its contents and/or update its entries. The server 18 is configured to determine whether comparable features to those described in the entries are already present in other software programs (e.g., those of competitors). This can be useful to the product manager 14 in determining which features from the log 12 should be included in an upcoming release of a software program. The "product manager" could be a business manager, or a software development manager, for example. Of course, other non-management users could access the log 12 in a similar fashion in some embodiments (e.g., software developers tasked with coding a given feature and wanting to know if that feature is already available in open source software).

The server 18 obtains a text description of a given entry in the log 12, and decomposes the text description using one or more predefined n-gram decomposition techniques to produce a first set of n-grams (source n-grams). The server 18 is able to access an aggregate data set 20 that includes data from one or more web servers 22A-N (accessible via a wide area network "WAN" 24, such as the Internet), and optionally also from one or more servers 26 (accessible via a local area network "LAN" 28). The server 18 determines a second set of n-grams from the aggregate gate set 20 which describe one or more second software programs that are different than the program under development (target n-grams).

The server 18 determines whether the second software program(s) include the feature, with the determining including comparing the first set of n-grams to the second set of n-grams, and calculating a similarity metric based on the comparing that indicates an extent to which matches for the n-grams in the first set are present in the second set. The server 18 updates the log 12 based on the determination. This may be repeated for many second software programs, and for many features. It may also be performed to compare against other software programs of a single organization and/or against open source software programs.

Figure 2:
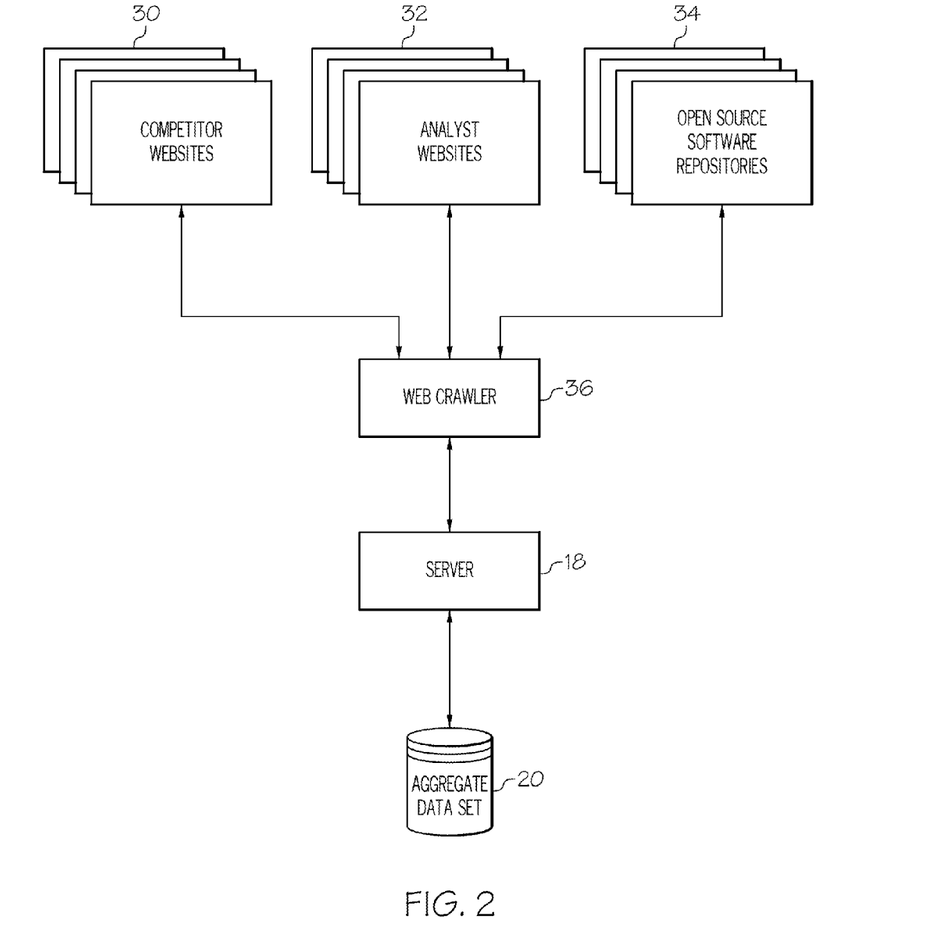
FIG. 2 schematically illustrates a plurality of example data sources from which data may be obtained for determining whether software programs include a given feature.

FIG. 2 schematically illustrates a plurality of data sources 30-34 from which data may be obtained for determining whether software programs include a given feature. The data sources 30-34 that may be found on the various web servers 22A-N, and describe software programs in which it may be desirable to know if comparable features exist to those in the log 12. Such sources may an include competitor websites 30, analyst websites 32, and open source software (OSS) repositories 34, for example. The competitor websites 30 describe software programs of one or more competitors. OSS repositories 34 describe features present in open source programs. The analyst websites 32 describe software programs of one or more competitors and/or OSS programs, and may include industry publications, blogs, news sites, and the like, for example. Of course, it is understood that these are only examples, and that other data sources could be analyzed (e.g., news, press releases, forums, help files/documentation). In one or more embodiments, the software development log (e.g., "backlog") of another software program could be mined for target n-grams, which could facilitate an analysis of whether a given feature is planned for implementation in another software program.

A web crawler 36 obtains data from the various data sources 30-34, and provides that data to server 18 for storage in the aggregate data set 20. Assume that the log 12 is maintained by an organization for its software program. Although not shown in FIG. 2, the aggregate data set 20 may also store data that describes features of other software programs of the same organization. Such data could be obtained from server 26, via LAN 28 (as the information may come from within the same organization) or WAN 24, for example. This could be useful, for example, if the organization had a suite of products with different development teams. It is possible that a feature desired for product A has already been implemented for product B, but that the software developers of product A are unaware of this implementation. Comparison against a company's own products could be useful in this regard. In one or more embodiments, separate aggregate data sets 20 are maintained for each target (e.g., each OSS program, each competitor, each business unit of the company maintaining the log 12, etc.). In some embodiments, such as when help documentation is a data source, a tool other than web crawler 36 may be used to parse the help documentation (e.g., a text parsing utility possibly executed on the server 18).

The server 18 may provide users (e.g., product manager 14) with the option to limit which data sources are included in the aggregate data set 20. For example, in some embodiments one may wish to omit data from OSS repositories 34. In the same or other embodiments, the server 18 may give users the ability to exclude data which is already present in aggregate data set 20 from inclusion in a set of target n-grams that will be used for comparison against source n-grams from software development log 12.

Figure 3:
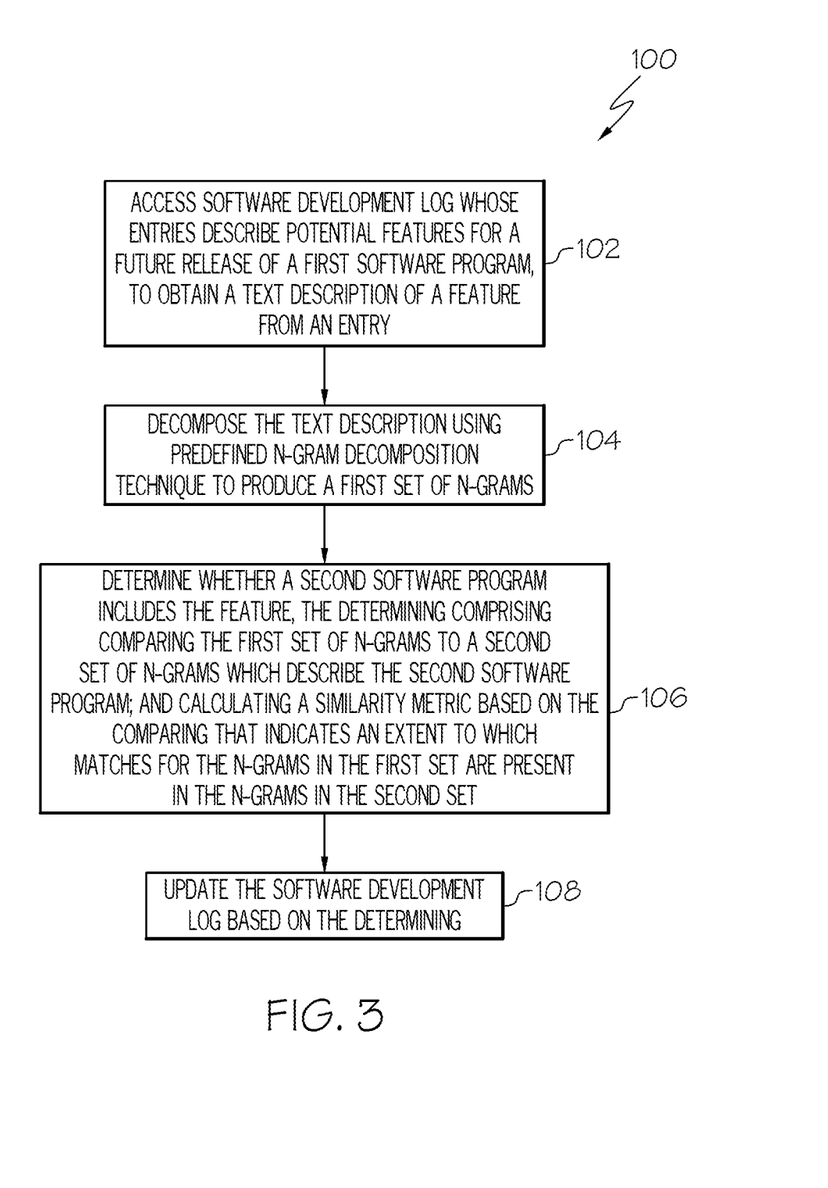
FIG. 3 is a flowchart of a computer-implemented method that can be used to determine whether software programs include a given feature.

FIG. 3 is a flowchart of a computer-implemented method 100 that can be used to determine if a given feature is present in a software program, with the method being implemented by server 18. The server 18 accesses software development log 12, whose entries describe potential features for a future release of a first software program, to obtain a text description of a feature from an entry (block 102). The server 18 decomposes the text description using a predefined n-gram decomposition technique to produce a first set of n-grams (block 104). The server 18 determines whether a second software program includes the feature (block 106). The determining of block 106 includes comparing the first set of n-grams to a second set of n-grams which describe the second software program; and calculating a similarity metric based on the comparing that indicates an extent to which matches for the n-grams in the first set are present in the second set. The server 18 updates the software development log 12 based on the determining (block 108). The updating of block 108 could include updating the software development log 12 to indicate a quantity of competitors whose software includes a given feature, to include identities of the competitors whose software includes the given feature, or both, for example.

In one or more embodiments, the calculating of the similarity metric (block 106) is based on a first threshold that indicates how common the n-grams in the first set must be in the second set to be considered matches, and a second threshold that indicates how much matching is required for a determination that the second software program includes the feature.

Consider, for example, that the second set of n-grams that describes a second software application may include 500 n-grams, which may be ranked based on how frequently they appear. If n-grams of the first set only match those in the bottom 5% of the second set then that would likely be considered less relevant than if those n-grams of the first set matched those found in the top 5% of the second set. The first threshold may indicate a cutoff for how common an n-gram in the second set must be within the second set to be eligible for match consideration. For example, one may wish to only consider the top 25 n-grams found in the second set of n-grams (target n-grams). The second threshold may indicate a percentage of n-grams in the first set that must be present in the second set to be considered a match (e.g., 80%).

Using this example of 80%, if the first set of n-grams includes 5 source n-grams, and four out of the five n-grams are found in the second set of n-grams, then this may meet the second threshold (because there is 80% matching), and the feature would be considered to be present in the second software application that the second set of n-grams describe as long as the first threshold was also fulfilled (i.e., if the n-grams in the second set identified as matching the n-grams in the first set are common enough within the second set).

In some embodiments of the method 100, the calculating of the similarity metric (block 106) is further based on weights assigned to the n-grams in the first set that indicate a relative importance of each of the n-grams in the first set in describing the feature.

A variety of different n-gram decomposition techniques could be used for block 104 to determine the first set of n-grams, and for determining other sets of n-grams (e.g., the second sets of n-grams that describe the second software program(s)). One such technique could include, for example, the one described in "A New Method of N-gram Statistics for Large Number of n and Automatic Extraction of Words and Phrases from Large Text Data of Japanese," Makoto Nagao and Shinsuke Mori (15th International Conference on Computational Linguistics (COLING 1994)). Because specific natural language processing and n-gram decomposition techniques are known to those of ordinary skill in the art, they are not discussed in detail herein.

Figure 4:
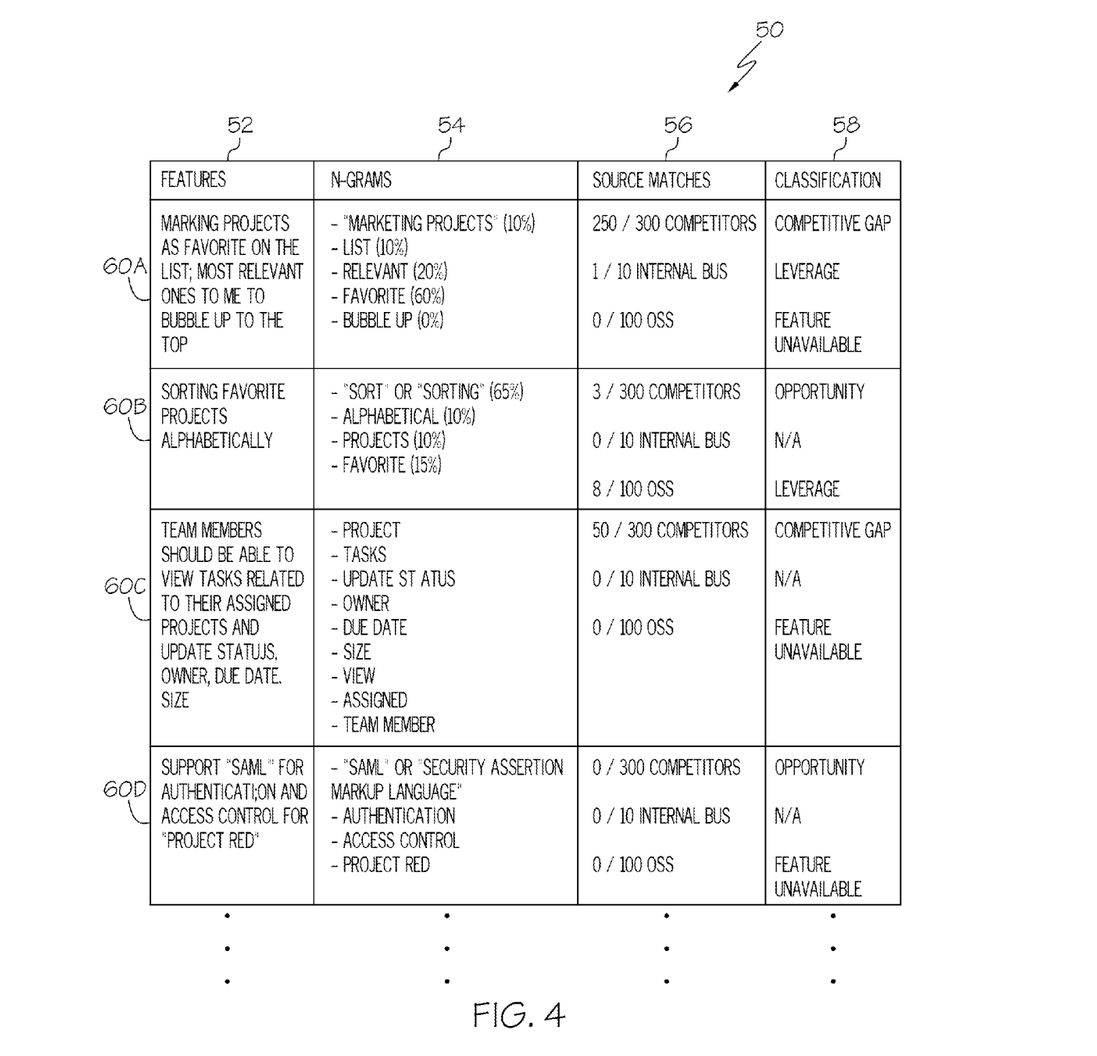
FIG. 4 illustrates a plurality of example features, their associated n-grams, and their associated classifications.

FIG. 4 illustrates table 50 that includes a plurality of example features 52, their associated n-grams 54, their matching information 56, and their associated classifications 58. The table 50 includes a plurality of entries 60A-D. Taking the first entry 60A as an example, it describes a feature of "Marking projects as favorite on the list; most relevant ones to me to bubble up to the top." The server 18 decomposes the text of entry 60A using one or more predefined n-gram decomposition techniques, to form a first set of n-grams for entry 60A that includes the following:
marketing projects
list
relevant
favorite
bubble up.

Each entry 60 has its own respective set of n-grams. Optionally, weights may be assigned to the n-grams. In the example of FIG. 4, the n-grams for entry 60A have the following weights.
marketing projects (10%)
list (10%)
relevant (20%)
favorite (60%)
bubble up (0%).

The weights may be assigned after the server 18 determines the n-grams, for example. In some embodiments, the server 18 assigns initial weights to the n-grams, and then permits the product manager 14 or another user to alter those weights. For example, each of the 5 n-grams for entry 60A may have an initial weight of 20%, which can then be altered by the product manager 14 or another user.

In the example of FIG. 4, the n-grams of each entry 60 are compared against 300 competitors, against 10 internal business units (abbreviated "BUS" in FIG. 4), and against 100 open source software projects. For entry 60A, based on the weights of its n-grams, and the first and second thresholds described above, the server 18 determines that 250 out of the 300 competitors include the feature in one of their software, that 1 out of 10 internal business units include the feature, and that 0 out of 100 OSS projects include the feature.

Based on these determinations, the server 18 can classify the feature of entry 60A. For the competitors, since 250 out of 300 competitors include the feature, but the program under development lacks the feature, this could be classified as a "competitive gap," indicating that the omission of the feature is a disadvantage because the feature is present in the products of many competitors. The "competitive gap" determination could be based on a third threshold, indicating how many competitors must have the feature before it is considered significant. For example, in entry 60C, 50 out of 300 competitors include the feature, which is still considered a competitive gap. However, if only one competitor out of many had the feature, then it may be less significant, and not considered a "competitive gap" in some embodiments.

In some embodiments, the classification may have a strength or degree depending on how close the similarity metric is to a given threshold. For example, a competitive gap could be classified as a "strong competitive gap" or a "weak competitive gap" depending on how close the similarity metric is to a given threshold for the competitive gap designation. The 250/300 competitors of entry 60A may be considered a "strong competitive gap" while the 50/300 competitors may be considered a "weak competitive gap," for example.

Referring again to entry 60A, 1 out of 10 internal business units includes the feature in its program, which is classified as "leverage" because the product manager 14 could potentially reuse code from within their organization to implement the feature in the program under development. Also, 0 out of 100 OSS programs include the feature, so the classification is "Feature unavailable" for OSS, because no code re-use opportunity is present for the feature in OSS software programs.

Referring now to entry 60B, its feature is "Sorting favorite projects alphabetically," which is decomposed into the following set of n-grams, to which the following weights are assigned:

"sort" or "sorting" (65%)
alphabetical (10%)
projects (10%)
favorite (15%)

As described above, the weights may be assigned after the server 18 determines the n-grams, for example. In some embodiments, the server 18 assigns initial weights to the n-grams, and then permits the product manager 14 or another user to alter those weights. For example, each of the five n-grams for entry 60A may have an initial weight of 25% (because there are four of them), and then those weights may be altered by the product manager 14 or another user.

Here too, the n-grams of each entry 60B are compared against 300 competitors, against 10 internal business units, and against 100 open source software projects. For entry 60B, based on the weights of its n-grams, and the first and second thresholds described above, the server 18 determines that only 3 out of the 300 competitors include the feature in one of their software programs, that 0 out of 10 internal business units include the feature, and that 8 out of 100 OSS projects include the feature.

Based on these determinations, the server 18 can classify the features. For the competitors, since only 3 out of 300 competitors include the feature, this is deemed to be an opportunity for standing apart from the competition, hence the "opportunity" classification. Moreover, because multiple OSS software programs include the feature, this feature is also classified as "leverage" because the feature could potentially be implemented into the program under development at no or very little charge using the OSS source code.

Referring again to the "first threshold" and "second threshold" described above, assume that the first threshold (which indicates how common the n-grams in the first set must be in the second set to be considered matches) is 15%. If the n-gram "marketing projects" in entry 60A was present in a competitor's n-grams but was in the bottom 15% in terms of how frequently it appeared, then that n-gram would not be eligible as a match for the competitor even if the n-gram was found for that competitor, because its relevance would be considered too low.

Assume also that the second threshold (that indicates how much matching is required for a determination that the second software program includes the feature) is 90%. This means that for entry 60A, for example, n-gram "list" (having a 10% weight) may not be found for a competitor, but the competitor could still potentially be a match if n-grams "marketing projects" (weight 10%), "relevant" (weight 20%), and "favorite" (weight 60%) were found.

Thus, depending on how the first threshold and second thresholds, and the optional weights, are set, granular control over what is considered a "match" is provided. Stated another way, the similarity metric of block 106 may be a function of the first and second thresholds, and optionally also a function of individual n-gram weights.

Referring again to FIG. 3, in one or more embodiments, the method 100 further comprises, prior to the comparing of block 106, translating an n-gram in the first set or the second set through use of a domain language filter. This could be useful in a variety of situations, such as when some terms in are not part of the common dictionary (e.g., product names, internal code names, etc.). Use of the domain language filter could be helpful for terms that have little or no meaning or context outside of a specific company or domain.

Consider the n-gram "Project Red" for entry 60D in FIG. 4. This may have meaning in the context of the company developing the program under development, but may have no meaning outside of that company, as it may be an internal product name. A domain language filter could include an alternate n-gram that could be used for "Project Red" to indicate a commercial name for the product, for example, such as "Fabulous Product." This would be much more likely to appear as a term in the aggregate data set 20 than an internal product name such as "Project Red."

In one or more embodiments of the method 100, the second software program of block 102 is one of a plurality of N software programs (e.g., 300 competitors as in FIG. 4), and the method 100 includes repeating the determining of block 106 for the remaining N−1 software programs to determine whether the remaining N−1 software programs include the feature, and updating the software development log (block 108) based on how many of the software programs in the group are determined to include the feature. Some non-limiting examples of this are shown in column 56 of FIG. 4.

In one or more embodiments of the method 100, the method includes determining a classification for the feature based on how many of the software programs in the group are determined to include the feature. In such embodiments, the updating of the software development log based on how many of the software programs in the group are determined to include the feature (block 108) comprises updating the software development log to indicate the determined classification for the feature. Some non-limiting examples of classifications are shown in column 58 in FIG. 4.

As discussed above, in some embodiments, the group of N software programs could be software programs of competitors. In the same or other embodiments, comparisons can be made against a group of N software programs that are open source software programs. In the same or other embodiments, the "first software program" of block 102 is a software program maintained by an organization, and comparisons can be made against a group of N software programs that are other software programs of the organization.

In one or more embodiments, for each of the software programs in the group, the server 18 decomposes text from the aggregate data set 20 that comprises information which describes the second software program, using one or more predefined n-gram decomposition techniques, to form the second set of n-grams. In such embodiments, the server 18 ranks the n-grams in the second set based on how frequently they appear in the aggregate data set, and the determining of whether the second software program includes the feature (block 106) is performed based on the ranking.

This ranking could be used in conjunction with the first threshold discussed above, which indicates how common the n-grams in the first set must be in the second set to be considered matches. In one or more embodiments, the second threshold is a cutoff that indicates how many times an n-gram must appear in the second set to be considered a match or indicates a percentage value below which n-grams in the second set will be discarded and/or considered ineligible for matches. In some embodiments, the product manager 14 (or another user) can overwrite the rankings, because certain target n-grams, even though appearing infrequently, may nevertheless be very important. Thus, they may be included in some embodiments even if falling below the cutoff. In the same or other embodiments, some target n-grams may be effectively exempted from the second threshold instead of or in addition to having their ranking altered.

In one or more embodiments, the decomposing of text from the aggregate data set 20 comprises receiving data that describes the second software program from a web crawler 36, and forming the aggregate data set from the received data. The web crawler 36 could obtain its data from any of the sources shown in FIG. 2, for example, or the other sources discussed above.

As discussed above in connection with FIG. 4, the same techniques used to determine whether a competitor's software program includes a given feature can be used to determine within the organization that maintains the software development log 12 for its software program (i.e., the "program under development") whether another of the organization's software programs include the given feature.

Also, as discussed above in connection with FIG. 4, the same technique used to determine whether a competitor's software program includes a given feature can be used to determine whether any OSS software programs include the feature.

In one or more embodiments, the method 100 includes creating a dashboard based on how many of the software programs in the group include the feature; and either displaying the dashboard on an electronic display (not shown), or transmitting the dashboard to another computing device for display (e.g., that of the computing device 16 in FIG. 1). The dashboard may resemble the table 50 of FIG. 4, for example, or may incorporate more graphical elements (e.g., charts, graphs, etc.). In some embodiments, the dashboard may indicate how many of a plurality of competitors include a given feature in their software, and/or may indicate whether any OSS programs include the given feature, and/or may indicate whether other software program(s) of the organization that maintains the log 12 include the given feature.

Figure 5:
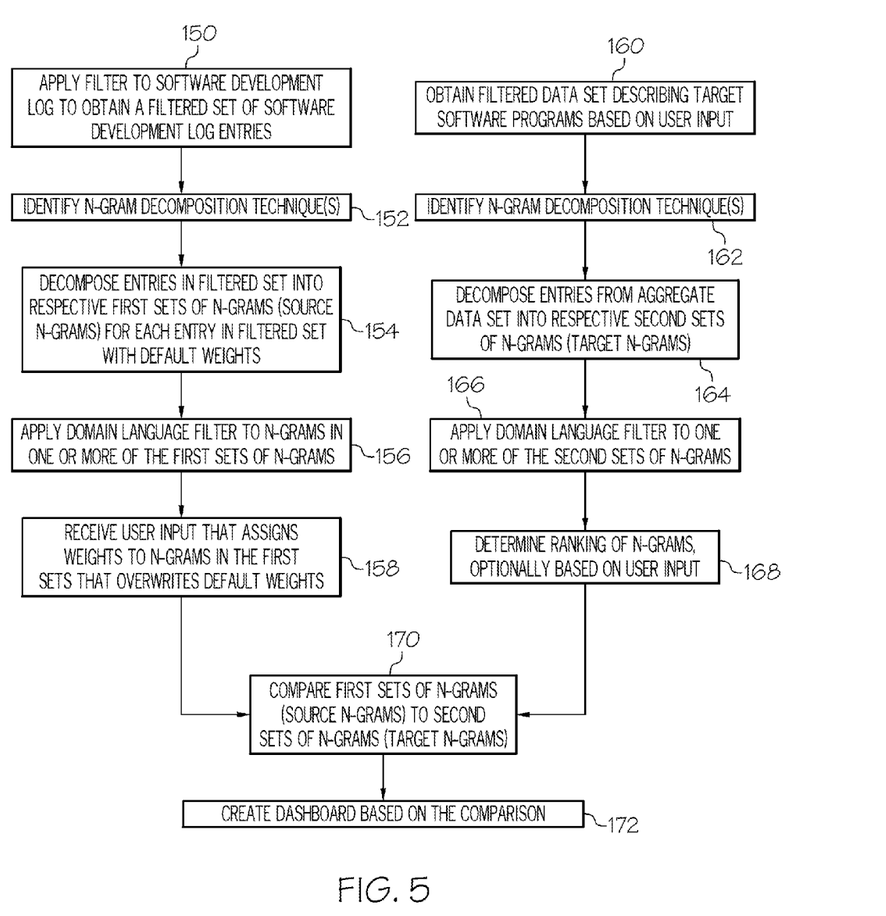
FIG. 5 illustrates an example embodiment of the method of FIG. 3.

FIG. 5 illustrates an embodiment of the method 100 of FIG. 3. Blocks 150-158 refer to obtaining source n-grams which describe features of the program under development, and blocks 160-168 describe obtaining target n-grams which describe the software programs against which the first set of n-grams is to be compared (e.g., those describing competitors, other programs from the company that produces the program under development, OSS software programs, etc.).

Referring first to blocks 150-154, a filter is applied to the software development log 12 to obtain a filtered set of software development log entries 12 (block 150). The filter may be applied by the product manager 14 (or other user) if analysis is desired for some, but not all, entries in the software development log 12. One or more n-gram decomposition techniques are identified (block 152). The identified n-gram decomposition technique(s) are used to decompose entries in the filtered set of entries into respective first sets of n-grams (source n-grams) for each entry in the filtered set, with default weights (block 154). The default weights may vary based upon n-gram quantity (e.g., if a given set has 5 n-grams, then each may have a weight of 20%).

A domain language filter, or other filter, is applied to translate one or more of the n-grams (block 156). The filtering of block 156 may be based on a list of words that are to be predefined as n-grams (e.g., product names), or that should be ignored (e.g., common language constructs, such as "vice versa"), or that should be considered equivalent or nearly equivalent. Such filtering may be based on a resource such as "WordNet" from Princeton University, for example (http://wordnet.princeton.edu). User input is then received that assigns weights to the n-grams in one or more of the first sets that overwrites the default weights (block 158) (see, e.g., entry 60A in FIG. 4, in which n-grams have differing weights).

Referring now to blocks 160-168, a filtered data set is obtained that describes target software programs, based on user input (block 160). The user input could indicate a user's specific area of interest (e.g., specific competitors and/or OSS repositories which are of interest for comparison). The filtering could be performed by a user to exclude certain pieces of information that are present in aggregate data set 20, for example, or to prevent those pieces of information from ever entering the aggregate data set 20 (e.g., by instructing the server 18 to omit certain competitors or competitor products from analysis). One or more n-gram decomposition techniques are identified (block 162). The identified n-gram decomposition technique(s) are used to decompose entries in the filtered set of entries into respective second sets of n-grams to serve as target n-grams (block 164). In some embodiments, each competitor may have their own "second set" of n-grams. In some embodiments, each target software program being analyzed may have its own "second set" of n-grams (e.g., such that a competitor with multiple products has multiple sets of target n-grams). A domain language filter, or other filter, is applied to translate one or more of the n-grams (block 166). Rankings are then determined for the various sets of target n-grams, optionally based on user input (block 168). In one or more embodiments, determining the rankings include determining how common the target n-grams are in their respective sets, and the user input may overwrite these default rankings by boosting certain n-grams whose appearance, even if not occurring many times, is still very significant. Each set of source n-grams is then compared to each set of target n-grams (block 170), and a dashboard is created based on the comparison (172).

Figure 6:
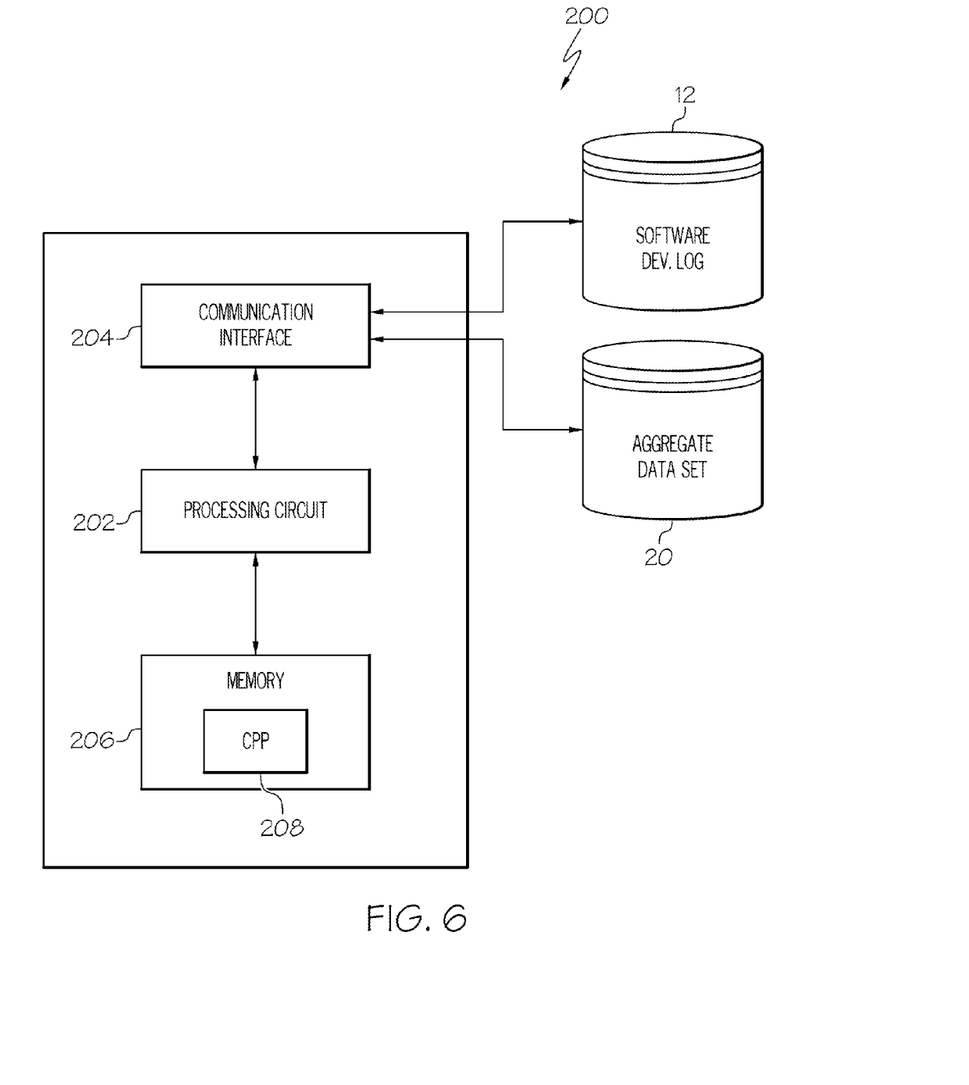
FIG. 6 schematically illustrates a computing device operative to implement the method of claim 3.

FIG. 6 schematically illustrates a computing device 200 that is operative to implement the method 100. The computing device 200 may be configured to implement any combination of the techniques discussed above. The computing device 200 may be the server 18, for example. The computing device 200 includes an communication interface circuit 204 configured to communicate with software development 12 log whose entries describe potential features for a future release of a first software program. The computing device 200 also includes a processing circuit 202 that is operatively connected to the interface circuit 204, and is configured to access the software development log 12 to obtain a text description of a feature from an entry, and decompose the text description using a predefined n-gram decomposition technique to produce a first set of n-grams. The processing circuit 202 is further configured to determine whether a second software program includes the feature. To determine whether the second software program includes the feature, the processing circuit 202 is configured to compare the first set of n-grams to a second set of n-grams which describe the second software program; and calculate a similarity metric based on the comparing that indicates an extent to which matches for the n-grams in the first set are present in the second set. The processing circuit 202 is further configured to update the software development log based on the determining.

The computing device 200 also includes a memory circuit 206 which is a computer readable storage medium that stores instructions for operation of the computing device 200, including, for example, a computer program product 208 that configures the computing device 200. As shown in FIG. 6, the interface circuit 204 is also configured to communicate with aggregate data set 20. Although the software development log 12 and aggregate data set 20 are shown as being external to the server 200 in FIG. 6, it is understood that this is a non-limiting example. One or both of the log 12 and aggregate data set 20 may be inside the computing device 200, directly connected to the computing device 200 (e.g., as external drives), or could be accessible via local area network 28 or wide area network 24.

In one or more embodiments, the processing circuit 202 is configured to calculate the similarity metric based on the first threshold that indicates how common the n-grams in the first set must be in the second set to be considered matches, and based on the second threshold that indicates how much matching is required for a determination that the second software program includes the feature.

In one or more embodiments, the processing circuit 202 is further configured to base the calculation of the similarity metric on weights assigned to the n-grams in the first set that indicate a relative importance of each of the n-grams in the first set in describing the feature. In some embodiments, prior to the comparison of the first and second sets of n-grams, the processing circuit 202 is further configured to translate an n-gram in the first set or the second set through use of a domain language filter.

In one or more embodiments, the second software program is part of a group of N software programs, and the processing circuit 202 is further configured to repeat the determination for the remaining N−1 software programs to determine whether the remaining N−1 software programs include the feature; and update the software development log based on how many of the software programs in the group are determined to include the feature.

In one or more embodiments, the processing circuit 202 is further configured to determine a classification for the feature based on how many of the software programs in the group are determined include the feature. In such embodiments, to update the software development log based on how many of the software programs in the group are determined to include the feature, the processing circuit 202 is configured to update the software development log to indicate the determined classification for the feature. Examples of this are shown in FIG. 4, where the example classifications include "competitive gap", "leverage", "opportunity," and "feature unavailable."

As discussed above, in some embodiments, the group of N software programs could be software programs of competitors. In the same or other embodiments, comparisons can be made against a group of N software programs that are open source software programs. In the same or other embodiments, the "first software program" is a software program maintained by an organization, and comparisons can be made against a group of N software programs that are other software programs of the organization.

In one or more embodiments, the processing circuit 202 is further configured to, for each of the software programs in the group, decompose text from aggregate data 20 set that comprises information which describes the second software program using one or more predefined n-gram decomposition techniques, to form the second set of n-grams; and rank the n-grams in the second set based on how frequently they appear in the aggregate data set 20. In such embodiments, the determination of whether the second software program includes the feature may be performed based on the ranking.

In one or more embodiments, to decompose text from the aggregate data set 20, the processing circuit 202 is configured to receive data that describes the second software program from a web crawler; and form the aggregate data set 20 from the received data.

As discussed above in connection with FIG. 4, the same technique used to determine whether a competitor's software program includes a given feature can be used to determine within the organization that maintains the software development log 12 for its software program (i.e., the "program under development") whether another of the organization's software programs includes the given feature.

Also, as discussed above in connection with FIG. 4, the same technique used to determine whether a competitor's software program includes a given feature can be used to determine whether any OSS software programs include the feature.

In one or more embodiments, the processing circuit 202 is further configured to create a dashboard based on how many of the software programs in the group include the feature; and either display the dashboard on an electronic display (not shown) or transmit the dashboard to another computing device for display (e.g., that of the computing device 16 in FIG. 1). The dashboard may resemble the table 50 of FIG. 4 for example, or may incorporate more graphical elements (e.g., charts, graphs, etc.). In some embodiments, the dashboard may indicate how many of a plurality of competitors include a given feature in their software, and/or may indicate whether any OSS programs include the given feature, and/or may indicate whether other software program(s) of the organization that maintains the log 12 include the given feature.

The memory circuit 206 of computing device 200 may store a computer program product 208 that configures the computing device 200. The computer program product 208 includes a computer readable storage medium having computer readable program code embodied therewith. The computer readable program code includes computer readable program code configured to access the software development log 12 whose entries describe potential features for a future release of a first software program, to obtain a text description of a feature from an entry; and computer readable program code configured to decompose the text description using a predefined n-gram decomposition technique to produce a first set of n-grams (source n-grams). The computer readable program code also includes computer readable program code configured to determine whether a second software program includes the feature, comprising: computer readable program code configured to compare the first set of n-grams to a second set of n-grams (target n-grams) which describe the second software program; and computer readable program code configured to calculate a similarity metric based on the comparing that indicates an extent to which matches for the n-grams in the first set are present in the second set. The computer readable program code also includes computer readable program code configured to update the software development log 12 based on the determining.

Of course, although the computer program product 208 is depicted as being stored in memory circuit 206 of the computing device 200, it is understood that the computer program product 208 could be stored on another computer readable storage medium (e.g., a separate computing device, removable media, etc.).

The techniques discussed above can greatly improve the process through which software development log entries are selected for inclusion in a future release of a software program. A high level of automation can be achieved, as well as a degree of thoroughness and detail that would previously have been cost and/or time-prohibitive. Moreover, product managers (or other users) that use the techniques discussed above would know that their feature selections for a given release have a strong basis, and can avoid blind selection of features without having a thorough understanding of their competitive landscape. Still further, the techniques above can help identify opportunities for code reuse, potentially freeing up development resources to work on other features.

The present embodiments may, of course, be carried out in other ways than those specifically set forth herein without departing from essential characteristics of the disclosure. For example, it should be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present disclosure is not limited by the foregoing description and accompanying drawings. Instead, the present disclosure is limited only by the following claims and their legal equivalents.

What is claimed is:

1. A computer-implemented method comprising:
accessing a software development log whose entries describe potential features for a future release of a first software program, to obtain a text description of a feature from an entry;
decomposing the text description using a predefined n-gram decomposition technique to produce a first set of n-grams;
determining whether a second software program includes the feature, wherein the second software program is part of a group of N software programs, wherein N comprises an integer greater than 1, the determining comprising:
comparing the first set of n-grams to a second set of n-grams which describe the second software program; and
calculating a similarity metric based on the comparing that indicates an extent to which matches for the n-grams in the first set are present in the second set, wherein calculating the similarity metric is based on:
a first threshold that indicates how common the n-grams in the first set must be in the second set to be considered match-eligible; and
a second threshold that indicates how much matching is required for a determination that the second software program includes the feature;
repeating the determining for the remaining N−1 software programs to determine whether the remaining N−1 software programs include the feature; and
updating the software development log based on how many of the software programs in the group are determined to include the feature.

2. The computer-implemented method of claim 1, further comprising, prior to the comparing:
translating an n-gram in the first set or the second set through use of a domain language filter.

3. The computer-implemented method of claim 1, further comprising:
determining a classification for the feature based on how many of the software programs in the group are determined include the feature;
wherein said updating the software development log based on how many of the software programs in the group are determined to include the feature comprises updating the software development log to indicate the determined classification for the feature.

4. The computer-implemented method of claim 3, wherein the group of N software programs are software programs of competitors.

5. The computer-implemented method of claim 3, wherein the group of N software programs are open source software programs.

6. The computer-implemented method of claim 3, wherein the first software program is a software program maintained by an organization, and wherein the group of N software programs are other software programs of the organization.

7. The computer-implemented method of claim 3, further comprising, for each of the software programs in the group:
decomposing text from an aggregate data set that comprises information which describes the second software program, using one or more predefined n-gram decomposition techniques, to form the second set of n-grams; and
ranking the n-grams in the second set based on how frequently they appear in the aggregate data set;

wherein said determining whether the second software program includes the feature is performed based on the ranking.

8. The computer-implemented method of claim 7, wherein said decomposing text from the aggregate data set comprises:
receiving data that describes the second software program from a web crawler; and forming the aggregate data set from the received data.

9. The computer-implemented method of claim 1, further comprising:
creating a dashboard based on how many of the software programs in the group include the feature; and
either displaying the dashboard on an electronic display, or transmitting the dashboard to another computing device for display.

10. The computer-implemented method of claim 1 wherein the calculating of the similarity metric is further based on weights assigned to the n-grams in the first set that indicate a relative importance of each of the n-grams in the first set in describing the feature.

11. A computing device comprising:
an interface circuit configured to communicate with a software development log whose entries describe potential features for a future release of a first software program; and
a processing circuit operatively connected to the interface circuit and configured to:
access the software development log to obtain a text description of a feature from an entry;
decompose the text description using a predefined n-gram decomposition technique to produce a first set of n-grams;
determine whether a second software program includes the feature, wherein the second software program is part of a group of N software programs, and wherein N comprises an integer greater than 1, and wherein to determine whether the second software program includes the feature, the processing circuit is configured to:
compare the first set of n-grams to a second set of n-grams which describe the second software program; and
calculate a similarity metric based on the comparing that indicates an extent to which matches for the n-grams in the first set are present in the second set, wherein the processing circuit calculates the similarity metric based on:
a first threshold that indicates how common the n-grams in the first set must be in the second set to be considered match-eligible; and
a second threshold that indicates how much matching is required for a determination that the second software program includes the feature;
repeat the determination for the remaining N−1 software programs to determine whether the remaining N−1 software programs include the feature; and update the software development log based on how many of the software programs in the group are determined to include the feature.

12. The computing device of claim 11, wherein the processing circuit is further configured to, prior to the comparison:
translate an n-gram in the first set or the second set through use of a domain language filter.

13. The computing device of claim 11, wherein the processing circuit is further configured to:

determine a classification for the feature based on how many of the software programs in the group are determined include the feature;
wherein to update the software development log based on how many of the software programs in the group are determined to include the feature, the processing circuit is configured to update the software development log to indicate the determined classification for the feature.

14. The computing device of claim 13, wherein the group of N software programs are software programs of competitors.

15. The computing device of claim 13, wherein the group of N software programs are open source software programs.

16. The computing device of claim 13, wherein the first software program is a software program maintained by an organization, and wherein the group of N software programs are other software programs of the organization.

17. The computing device of claim 11, wherein the processing circuit is further configured to, for each of the software programs in the group:
decompose text from an aggregate data set that comprises information which describes the second software program, using one or more predefined n-gram decomposition techniques, to form the second set of n-grams; and rank the n-grams in the second set based on how frequently they appear in the aggregate data set;
wherein the determination of whether the second software program includes the feature is performed based on the ranking.

18. The computing device of claim 17, wherein to decompose text from the aggregate data set, the processing circuit is configured to:
receive data that describes the second software program from a web crawler; and form the aggregate data set from the received data.

19. The computing device of claim 11, wherein the processing circuit is further configured to:
create a dashboard based on how many of the software programs in the group include the feature; and
either display the dashboard on an electronic display or transmit the dashboard to another computing device for display.

20. The computing device of claim 11, wherein the processing circuit is further configured to base the calculation of the similarity metric on weights assigned to the n-grams in the first set that indicate a relative importance of each of the n-grams in the first set in describing the feature.

21. A computer program product comprising:
a computer readable storage medium having computer readable program code embodied therewith, the computer readable program code, when executed by a processing circuit, causes the processing circuit to:
access a software development log whose entries describe potential features for a future release of a first software program, to obtain a text description of a feature from an entry;
decompose the text description using a predefined n-gram decomposition technique to produce a first set of n-grams;
determine whether a second software program includes the feature, wherein the second software program is part of a group of N software programs, and wherein N comprises an integer greater than 1, and wherein to determine whether a second software program includes the feature, the computer readable program code is configured to cause the processing circuit to:

compare the first set of n-grams to a second set of n-grams which describe the second software program; and calculate a similarity metric based on the comparing that indicates an extent to which matches for the n-grams in the first set are present in the second set, wherein the computer readable program code causes the processing circuit to calculate the similarity metric based on:
  a first threshold that indicates how common the n-grams in the first set must be in the second set to be considered match-eligible; and
  a second threshold that indicates how much matching is required for a determination that the second software program includes the feature;

repeat the determination for the remaining N−1 software programs to determine whether the remaining N−1 software programs include the feature; and update the software development log based on how many of the software programs in the group are determined to include the feature.

* * * * *